United States Patent
Kondo

(10) Patent No.: US 8,271,808 B2
(45) Date of Patent: Sep. 18, 2012

(54) COMPUTER SYSTEM, SUBORDINATE DEVICE, AND POWER SUPPLY CONTROL METHOD

(75) Inventor: Shuhei Kondo, Tokyo (JP)

(73) Assignee: NEC Corporation, Tokyo (JP)

( * ) Notice: Subject to any disclaimer, the term of this patent is extended or adjusted under 35 U.S.C. 154(b) by 715 days.

(21) Appl. No.: 12/399,310

(22) Filed: Mar. 6, 2009

(65) Prior Publication Data

US 2009/0228728 A1    Sep. 10, 2009

(30) Foreign Application Priority Data

Mar. 6, 2008   (JP) ................................ 2008-056197

(51) Int. Cl.
  G06F 1/32   (2006.01)
  G06F 1/26   (2006.01)
  G06F 1/30   (2006.01)
(52) U.S. Cl. ........ 713/300; 713/310; 713/320; 713/323; 713/324; 713/330; 713/340; 398/25; 398/33
(58) Field of Classification Search ............... 713/300, 713/310, 320–324, 330, 340
   See application file for complete search history.

(56) References Cited

U.S. PATENT DOCUMENTS

| | | | |
|---|---|---|---|
| 5,956,168 A * | 9/1999 | Levinson et al. ............... | 398/41 |
| 6,023,357 A * | 2/2000 | Miyasita ....................... | 398/139 |
| 2008/0315110 A1 * | 12/2008 | Iwatschenko-Borho et al. ............................ | 250/394 |

FOREIGN PATENT DOCUMENTS

| | | |
|---|---|---|
| JP | 60-17051 A | 2/1985 |
| JP | 2-55318 A | 4/1990 |
| JP | 7-200105 A | 8/1995 |
| JP | 9-258861 A | 10/1997 |
| JP | 305879 A | 11/1999 |
| JP | 2007072600 A | 3/2007 |

OTHER PUBLICATIONS

Japanese Office Action for JP2008-056197 issued Feb. 2, 2010.
Japanese Office Action for JP2008-056197 issued Aug. 10, 2010.
Japanese Office Action for JP2008-056197 issued Sep. 6, 2011.

* cited by examiner

Primary Examiner — Fahmida Rahman

(57) ABSTRACT

A computer system includes a main device and a subordinate device. Data transmission and reception by means of an optical transmission system are performed by connecting the main device and the subordinate device by an optical transmission cable. The subordinate device, a power of which needs to be cut-off prior to the main device, includes a light reception determination part and a power supply control part. The light reception determination part determines whether the main device is in a power-off state by presence or absence of light reception based on a light-receiving amount received by a photoelectric converter. When it is determined that the main device is in the power-off state, the power supply control part controls a power supply device so as to cut-off the power of the subordinate device.

4 Claims, 6 Drawing Sheets

COMPUTER SYSTEM, SUBORDINATE DEVICE, AND POWER SUPPLY CONTROL METHOD

This application is based on Japanese Patent Application No. 2008-056197 filed on Mar. 6, 2008 and including specification, claims, drawings and summary. The disclosure of the above Japanese Patent Application is incorporated herein by reference in its entirety.

BACKGROUND OF THE INVENTION

1. Field of the Invention

The present invention relates to a computer system, a subordinate device, and a power supply control method. In particular, the present invention relates to a computer system, a subordinate device, and a power supply control method which are suitable for an efficiency-increase and a power saving in a power-off operation.

2. Description of the Related Art

In a computer system such as a disc array system, common is a configuration in which a main device such as a host computer and a subordinate device such as a disk array device are connected by a prescribed interface. In such a computer system, when turning off the system, for example, due to a maintenance work, the sequence of cutting off a power supply of each device that composes the system may be specified. In the case of the disc array system or the like, the power supply of the disk array device in usual circumstance always needs to be on while the host computer is running. Therefore, in the case of the disc array system or the like, the power-off of the disk array device must be started after completion of the power-off of the host computer.

When such a work of power-off is performed manually, an operator first performs an operation for power-off of the host computer, thereafter, waits for the complete power-off of the host computer, and then performs the operation for power-off of the disk array device or the like, after confirming the complete power-off of the host computer. However, a waiting time of several minutes may be required after the operation of power-off of the host computer is performed until the completion of power-off of the host computer. Such a waiting time can become a factor which reduces working efficiency.

On the other hand, the operator cannot always perform the operation for power-off of the disk array device or the like, immediately after completing the power-off of the host computer, when performing another work in the waiting time in order to use such a waiting time effectively. Therefore, in spite of the power-off of the host computer, a power-on state of the disk array device, or the like, may continue. In this case, a wasteful power will be consumed until the operator performs the operation for power-off of the disk array device, or the like.

As a method of solving such a problem, for example, in Unexamined Japanese Patent Application KOKAI Publication No. H11-305879 (hereinafter referred to as "Patent Literature 1"), a method of interlocking a power supply control using an uninterruptible power supply device (a so-called UPS) is disclosed, and in Unexamined Japanese Patent Application KOKAI Publication No. 2007-72600 (hereinafter referred to as "Patent Literature 2") for example, a method of interlocking a power supply control using a special interface is disclosed.

However, in the case of adopting the method disclosed in Patent Literature 1, there is a problem that a configuration thereof becomes complicated and a cost increases since it is necessary to build the system incorporating the UPS. In the case of adopting the method disclosed in Patent Literature 2, there is an inconvenience that there is no versatility, and a construction or an alteration of the system cannot be performed easily since the interface for exclusive use is used in order to make the power supply control be interlocked.

The present invention has been made in view of the above-mentioned actual conditions, and an object of the present invention is to provide a computer system, a subordinate device, and a power supply control method which can perform a power supply interlocking control easily.

SUMMARY OF THE INVENTION

In order to attain the above-mentioned object, a computer system according to a first aspect of the present invention is the one comprised of a plurality of devices connected mutually by means of an optical transmission system, at least one of the plurality of devices comprising:

a light reception determination part determining presence or absence of light reception achieved by means of an optical transmission; and a power supply control part controlling a power supply operation of the at least one device at least based on a determination result by the light reception determination part.

In order to attain the above-mentioned object, a subordinate device according to a second aspect of the present invention is the one connected to a main device by means of an optical transmission system, comprising:

a light reception determination part determining presence or absence of light reception from the main device achieved by means of an optical transmission; and a power supply control part controlling a power supply operation of the subordinate device at least based on the determination result by the light reception determination part.

A power supply control method controls a power supply interlock among a plurality of devices connected mutually by means of an optical transmission system, the method comprises:

a light reception determination step of at least one of the plurality of devices determining presence or absence of light reception by means of the optical transmission; and a power supply control step of the at least one of the plurality of devices controlling a power supply device of the at least one device at least based on the determination result in the light reception determination step.

According to the present invention, a power supply interlocking control can be easily performed with a simple configuration.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENTS

Hereinafter, embodiments according to the present invention will be described with reference to figures.

Embodiment 1

Figure 1:
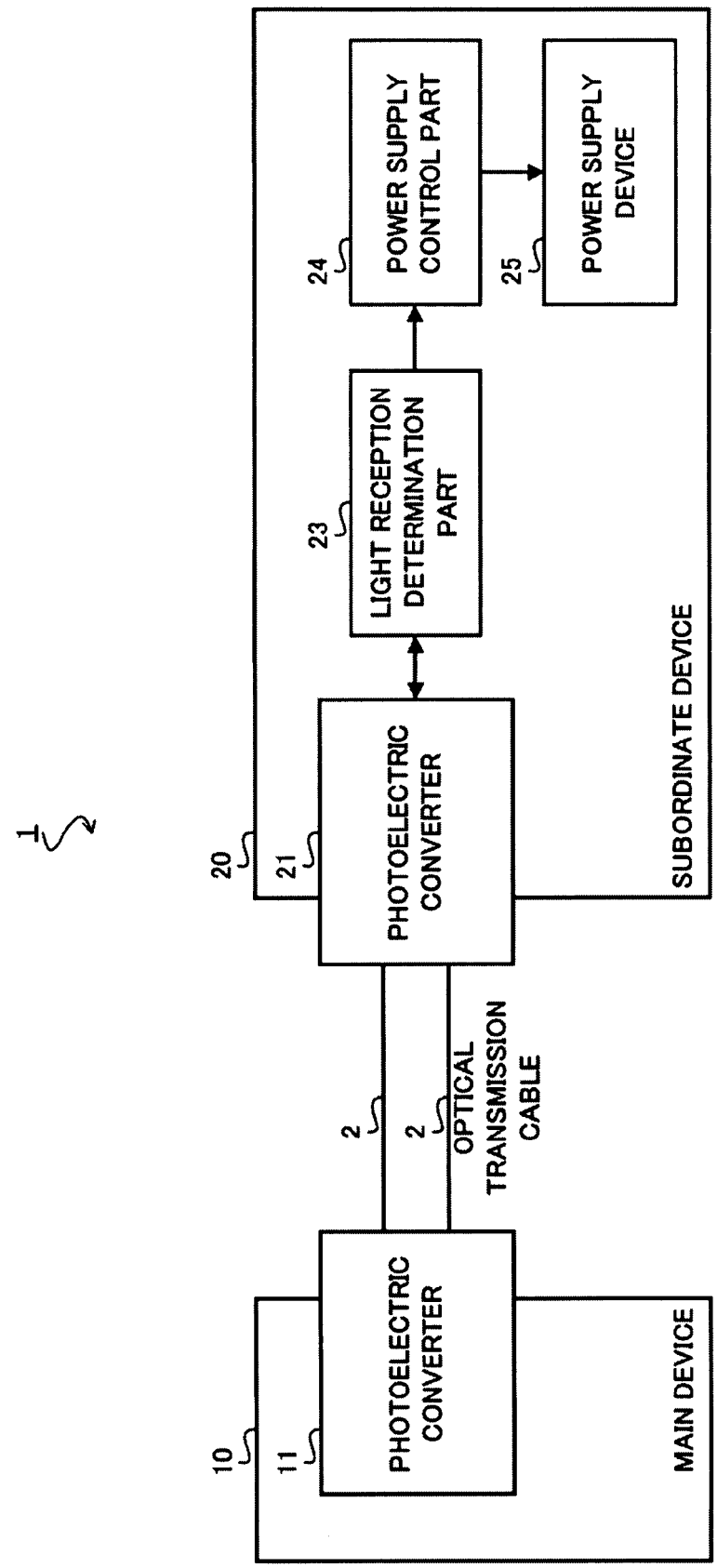
FIG. 1 is a block diagram illustrating a configuration of a computer system according to an embodiment of the present invention.

FIG. 1 is a block diagram illustrating a configuration example of a computer system 1 to which the present invention is applied. As illustrated in the figure, the computer system 1 according to the present embodiment is composed of two devices connected to each other by means of an optical transmission system. The present embodiment assumes that one of the two devices is a main device 10, and the other is a subordinate device 20 which the main device 10 uses.

The main device 10 and the subordinate device 20 are connected to each other based on a communication standard by means of the optical transmission system such as so-called Fiber Channel, for example. Consequently, each of the main device 10 and the subordinate device 20 is provided with a photoelectric converter (for example, SFP (Small Form-Factor Pluggable) optical transceiver, or the like) for performing mutual conversion between an electrical signal and an optical signal. A photoelectric converter 11 on the side of the main device 10 and a photoelectric converter 21 on the side of the subordinate device 20 are connected to each other by an optical transmission cable 2 which is composed of an optical fiber etc., for example.

Such a computer system 1 can be realized as a disc array system, for example. In this case, the main device 10 is a host computer, for example, and the subordinate device 20 becomes a disk array device, for example. Therefore, the main device 10 is composed of a CPU, a RAM, a ROM, a hard disk drive, a display device, a mouse, a keyboard, and the like, which are not illustrated. The subordinate device 20 is composed of logic circuits such as an LSI and an IC, and a plurality of hard disk drives, or the like, which are not illustrated.

Figure 2:
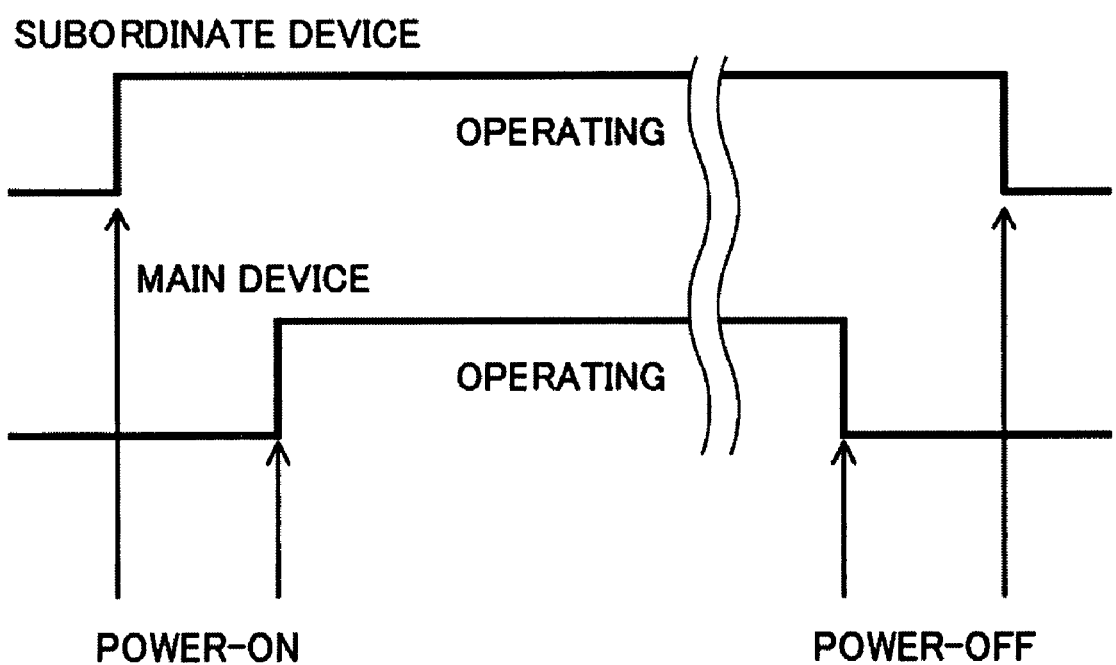
FIG. 2 is a figure for illustrating a timing of turning on and cutting off of each of power supplies of a main device and a subordinate device which are illustrated in FIG. 1.

A sequence of turning on and cutting off of the power supply is assumed to be specified between the main device 10 and the subordinate device 20. In the present embodiment, for example as illustrated in FIG. 2, it is assumed that there is a relation between the main device 10 and the subordinate device 20 that the power supply of the subordinate device 20 must always be turned on while the main device 10 is operating. That is, at least, when the computer system 1 is caused to stop, it is assumed that the power supply of the subordinate device 20 is required to be cut off after completion of the power-off of the main device 10.

In the present embodiment, the power supply of the main device 10 and that of the subordinate device 20 are controlled so that the power supply of the subordinate device 20 is cut off after the completion of power-off of the main device 10. Therefore, as illustrated in FIG. 1, a light reception determination part 23 and a power supply control part 24 for controlling the power supply are formed on the side of the subordinate device 20 the power supply of which needs to be cut off afterwards. These light reception determination part 23 and power supply control part 24 include logic circuits, or the like, such as an LSI and an IC, for example.

The light reception determination part 23 determines presence or absence of light reception by means of the optical transmission from the main device 10 by monitoring the photoelectric converter 21 included in the subordinate device 20.

The power supply control part 24 controls a power supply device 25 by generating a control signal corresponding to the determination result by the light reception determination part 23, and supplying the generated control signal to the power supply device 25.

Figure 3:
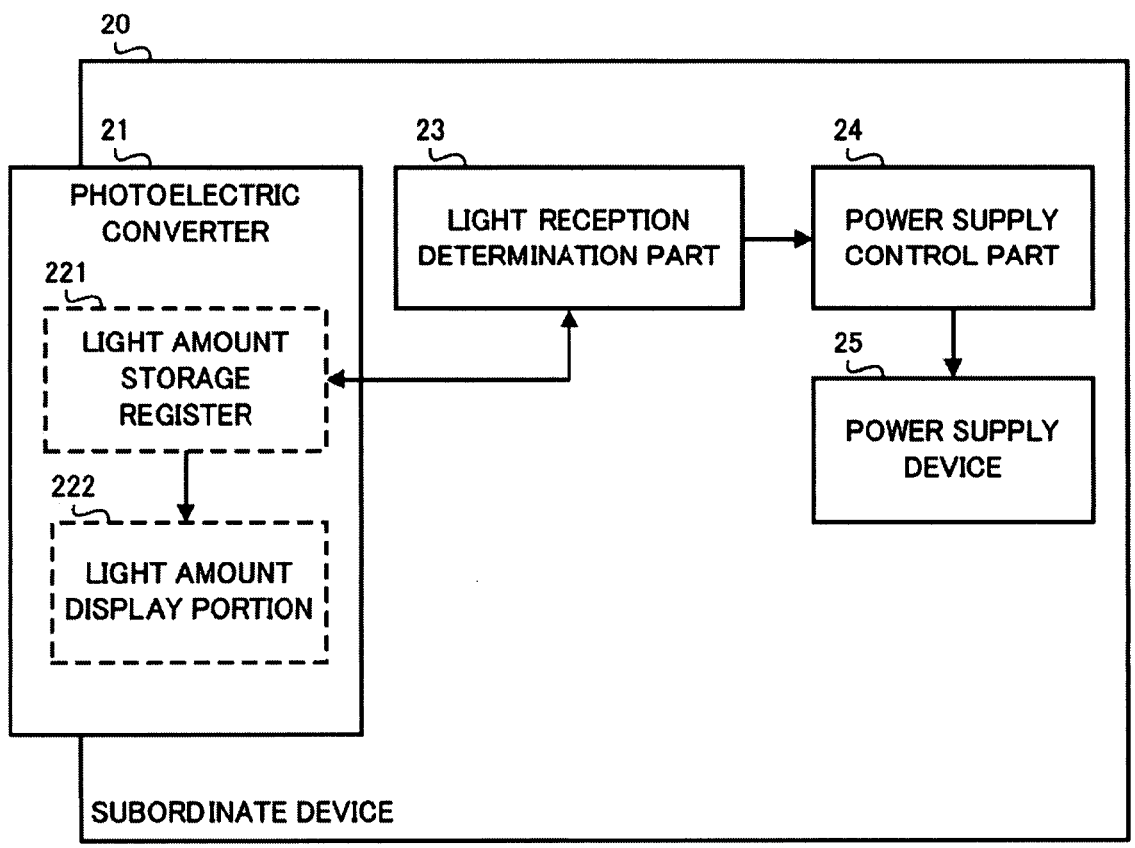
FIG. 3 is a block diagram illustrating a configuration of the subordinate device according to an embodiment 1 of the present invention.

The subordinate device 20 of such a configuration will be described in more detail with reference to FIG. 3. FIG. 3 is a block diagram illustrating the configuration of subordinate device 20.

As illustrated in FIG. 3, the photoelectric converter 21 according to the present embodiment has a light amount storage register 221 and a light amount display portion 222. The light amount storage register 221 and the light amount display portion 222 are usually provided with a standardized optical transceiver such as SFP etc. In the light amount storage register 221 written at any time is a value (hereinafter "the value indicating light-receiving amount" is just called "light-receiving amount") indicating a light amount (hereinafter, referred to as "light-receiving amount") of the optical signal received from the optical transmission cable 2. Therefore, the light reception determination part 23 can determine the presence or absence of the optical transmission from the main device 10 with reference to this light amount storage register 221. The light amount display portion 222 displays the light-receiving amount stored in the light amount storage register 221.

In a common optical transmission system such as Fiber Channel which transmits serial data, transmission and reception of idle pattern data are performed in a predetermined time cycle, even at the time of an idle state in which there is no data to be transmitted or received between devices, and light blinking in accordance with the idle pattern occurs. Accordingly, when the main device 10 is started normally, light is always blinking within the optical transmission cable 2. Therefore, while the main device 10 is operating, the value "0" is not continuously written in the light amount storage register 221 as the light-receiving amount. On the other hand, since the light does not blink when the main device 10 is caused to stop, the value "0" is continuously written in the light amount storage register 221 as the light-receiving amount.

Therefore, the subordinate device 20 can determine whether the main device 10 is operating or stopped by determining whether or not the value of the light-receiving amount stored in the light amount storage register 221 is "0" continuously for more than a predetermined period. As mentioned above, the power supply of the subordinate device 20 needs to be cut off after the completion of power-off of the main device 10. Therefore, the computer system 1 can be safely stopped if the power supply of the subordinate device 20 is cut off after detection of the completion of power-off of the main device 10, based on the light-receiving amount stored in the light amount storage register 221.

In the subordinate device 20 according to the present embodiment, the light reception determination part 23 determines the presence or absence of light reception based on the light-receiving amount stored in the light amount storage register 221, and the power supply control part 24 controls the power supply device 25 to cut off the power supply thereof when it is determined that there is no light reception (that is, the light-receiving amount is "0" continuously for more than the predetermined period). Thereby, the power supply of the subordinate device 20 is cut off automatically upon completion of the power-off of main device 10.

In order to realize such an operation, the light reception determination part 23 is connected to the photoelectric converter 21 with a common I2C (Inter-Integrated Circuit) interface, for example. Thereby, the light reception determination part 23 can always refer to the light-receiving amount stored in the light amount storage register 221, and can determine that the power-off of the main device 10 has been completed when the light-receiving amount has become "0" continuously for more than the predetermined period.

The power supply control part 24 cuts off the power supply of the subordinate device 20 by generating the control signal which makes the power supply of the subordinate device 20 be cut off and supplying the control signal to the power supply device 25, when the light reception determination part 23 determines that there is no light reception from the main device 10 (that is, the cutoff of the power supply of the main device 10 has been completed).

With such a configuration, the operation for power-off of the main device 10 is performed, and upon completion of the power-off the power supply of subordinate device 20 will be automatically cut off. That is, the power supply control interlocked between the main device 10 and the subordinate device 20 is performed. The configurations illustrated in FIG. 1 and FIG. 3 only show the configuration required for performing the power supply control interlocked between the main device 10 and the subordinate device 20, and other configurations which will be needed in each device shall be provided suitably.

Figure 4:
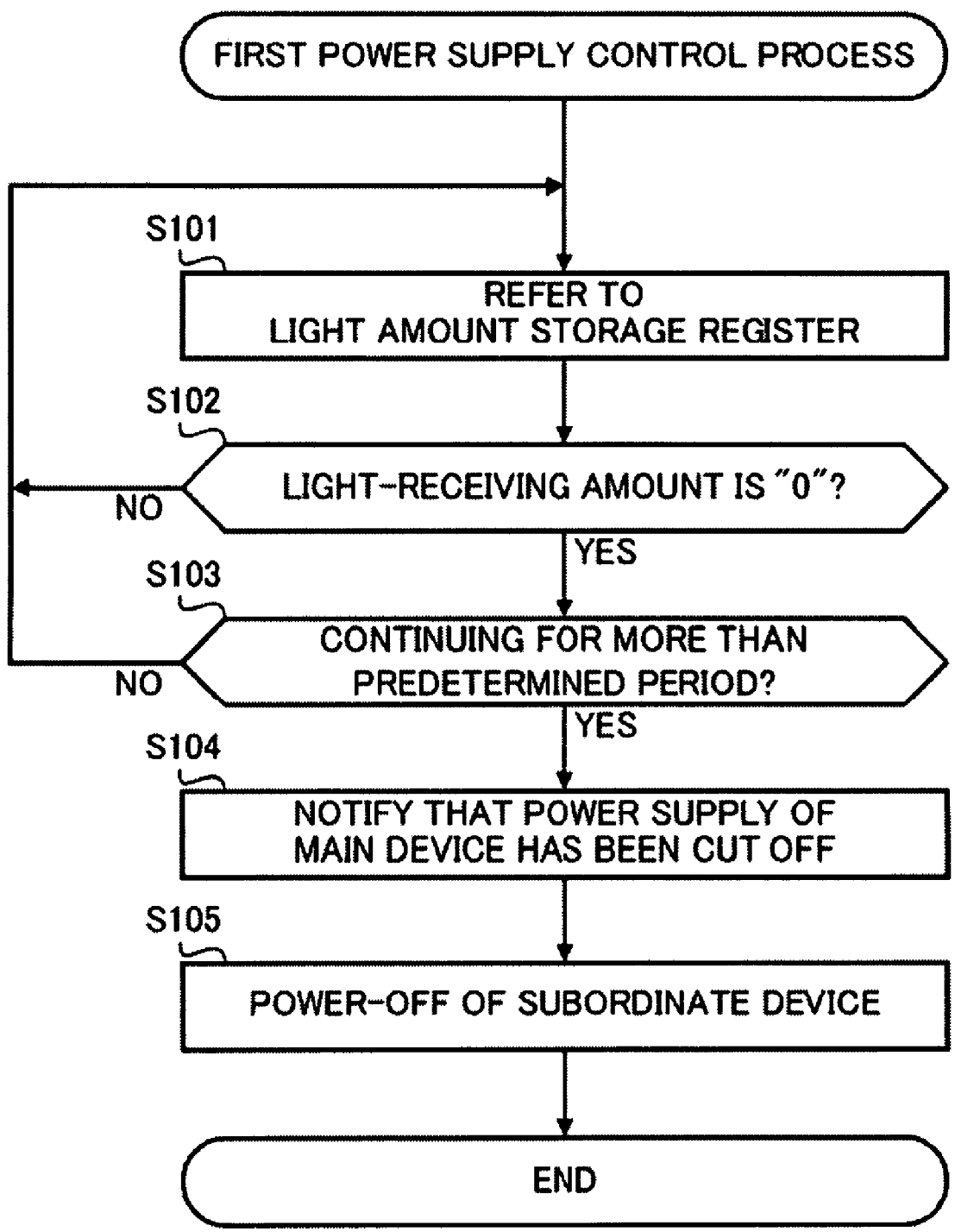
FIG. 4 is a flow chart for explaining a first power supply control process executed by the subordinate device according to the embodiment 1 of the present invention.

A first power supply control process performed in the subordinate device 20 of such configuration will be described with reference to a flow chart illustrated in FIG. 4. The first power supply control process is started, triggered by start-up of the subordinate device 20.

That is, when the subordinate device 20 is started, the light reception determination part 23 determines whether the light-receiving amount is "0" or not (step S102), with reference to the light amount storage register 221 (step S101).

Since the signal is transmitted by the blink of light in the optical transmission, the light-receiving amount may be "0" even if the main device 10 is operating. Therefore, when determining that light-receiving amount is "0" (step S102: Yes), the light reception determination part 23 determines whether or not the state has continued for more than the predetermined period (step S103). Here, a threshold value based on an interval etc. of the blinked light used in the optical transmission is set, and it is determined whether the state in which the light-receiving amount is "0" has continued for more than the threshold value. This threshold value can be set on the basis of the time cycle with which the transmission and reception of the idle pattern data are performed. For example, several fold time of this time cycle can be set as the threshold value.

When determining that the state in which light-receiving amount is "0" has continued for more than the predetermined period (step S103: Yes), the light reception determination part 23 judges that the main device 10 connected by means of the optical transmission has entered the state in which the power supply of the main device 10 has been cut off, and notifies the power supply control part 24 that the power supply of the main device 10 has been cut off (step S104).

The power supply control part 24 cuts off the power supply of the subordinate device 20 corresponding to the notice from the light reception determination part 23 (step S105). Specifically, the power supply control part 24 generates the control signal for performing the power-off operation, and supplies the generated control signal to the power supply device 25. Thereby, since the power supply device 25 starts the operation for cutting off the power supply, the power supply of the subordinate device 20 is cut off. When the power supply control part 24 cuts off the power supply of the subordinate device 20 (step S105), the first power supply control process will be finished.

On the other hand, when determining that the light-receiving amount is not "0" (step S102: No), or when determining that the state in which the light-receiving amount is "0" has not continued for more than the predetermined period (step S103: No), the light reception determination part 23 returns a process to the process which refers to the light amount storage register 221 (step S101). Therefore, in this case, the power-off of the subordinate device 20 mentioned above is not performed immediately.

As described above, according to the present embodiment, the power supply of the subordinate device 20 can be automatically cut off, triggered by no light reception from the side of the main device 10 which is connected by means of the optical transmission system.

Thereby, in the system in which the sequence of cutting off the power between the connected devices is specified, only by performing the operation for cutting off the power supply of the main device 10 the power supply of which is required to be cut off first, the power supply of the subordinate device 20 can be automatically cut off, triggered by the completion of power-off of the main device 10.

That is, for example, when the system is caused to stop due to a maintenance work etc., the system can be stopped safely, without an operator confirming completion of the power-off of the main device 10. As a result, the waiting time for the operator until the completion of the power-off of the main device 10 does not arise, and the work can be performed efficiently. Even if the operator performs another work until the completion of the power-off of the main device 10, there is also no wasteful power consumption since the power supply of the subordinate device 20 is automatically cut off at the same time of completion of the power-off of the main device 10.

Embodiment 2

In the above-mentioned embodiment 1, although the power supply of the subordinate device 20 shall be cut off, triggered by no light reception from the side of main device 10, the power supply control may be performed with no light reception from the side of main device 10 as one of conditions.

In the case of the subordinate device which needs to be always in a power-on state while the main device 10 is operating, the power supply of the subordinate device 20 needs to be turned on earlier than the main device 10 at the time of power-on. In the configuration of the above-mentioned embodiment 1, when the power supply of the main device 10 is cut off, the power supply of the subordinate device 20 will be also cut off automatically. However, for example, when only the power supply of the main device 10 is desired to be cut off, or when only the power supply of the main device 10 has been cut off due to a trouble, etc. without an intention, it may become inconvenient if the power supply of the subordinate device 20 is also cut off automatically. For example, when the main device 10 is restarted due to a malfunction, a situation where the power supply of the subordinate device 20 is not turned on may arise when the main device 10 is restarted.

Figure 5:
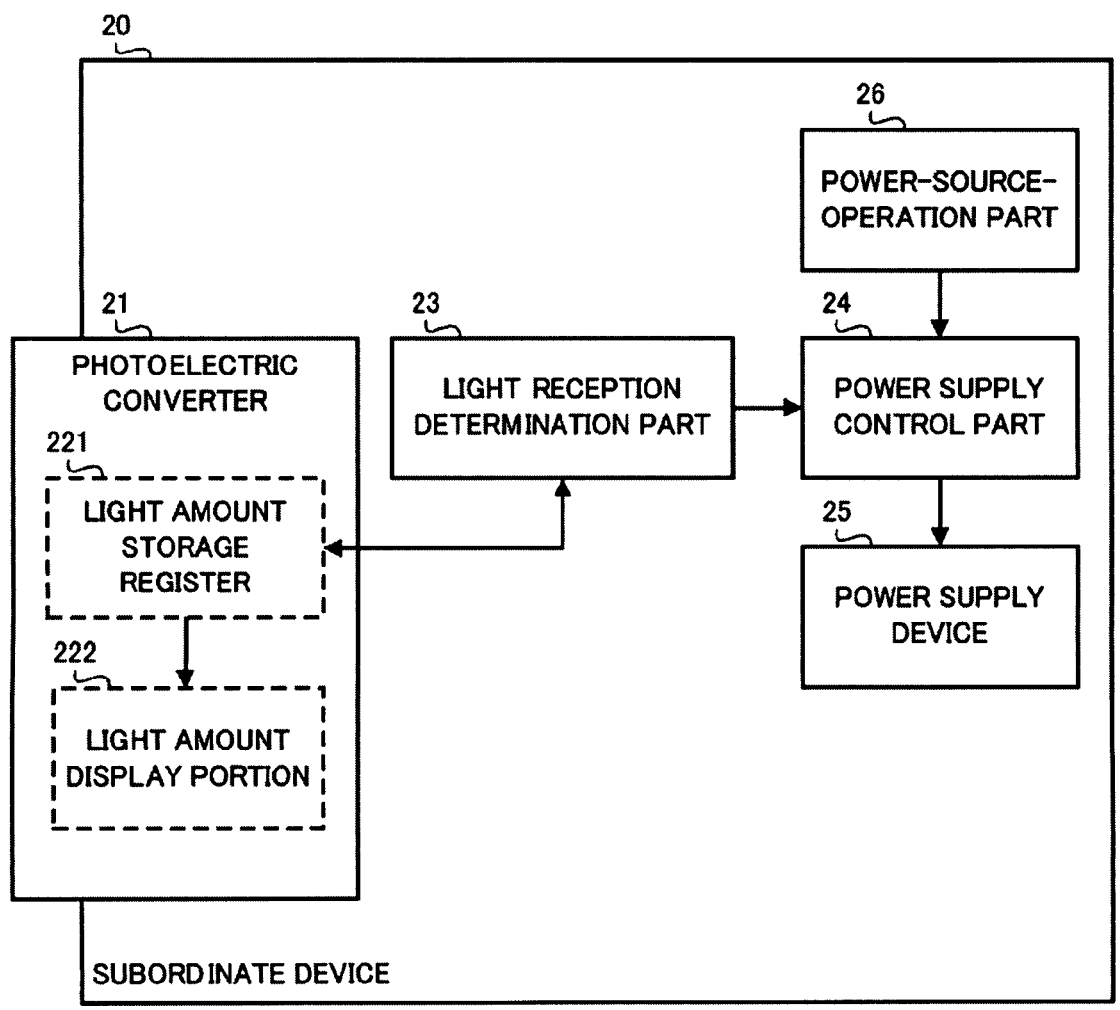
FIG. 5 is a block diagram illustrating a configuration of a subordinate device according to an embodiment 2 of the present invention.

In order to dissolve such inconvenience, in the present embodiment, an example will be shown in which the cutoff of the power supply of the subordinate device 20 is made to be interlocked only when the power supply of the main device 10 is intentionally cut off. In this case, as illustrated in FIG. 5, the example will be configured such that the power supply control part 24 may detect an operating condition of a manual power-source-operation part 26 included in the subordinate device 20. That is, with a configuration in which the power supply control part 24 may stand between the power-source-operation part 26 and the power supply device 25, the power supply control part 24 detects a state of the power-source-operation part 26 and determines the state of the manual power source operation. Note that the power-source-operation part 26 is composed of a switch, or the like, for example.

Figure 6:
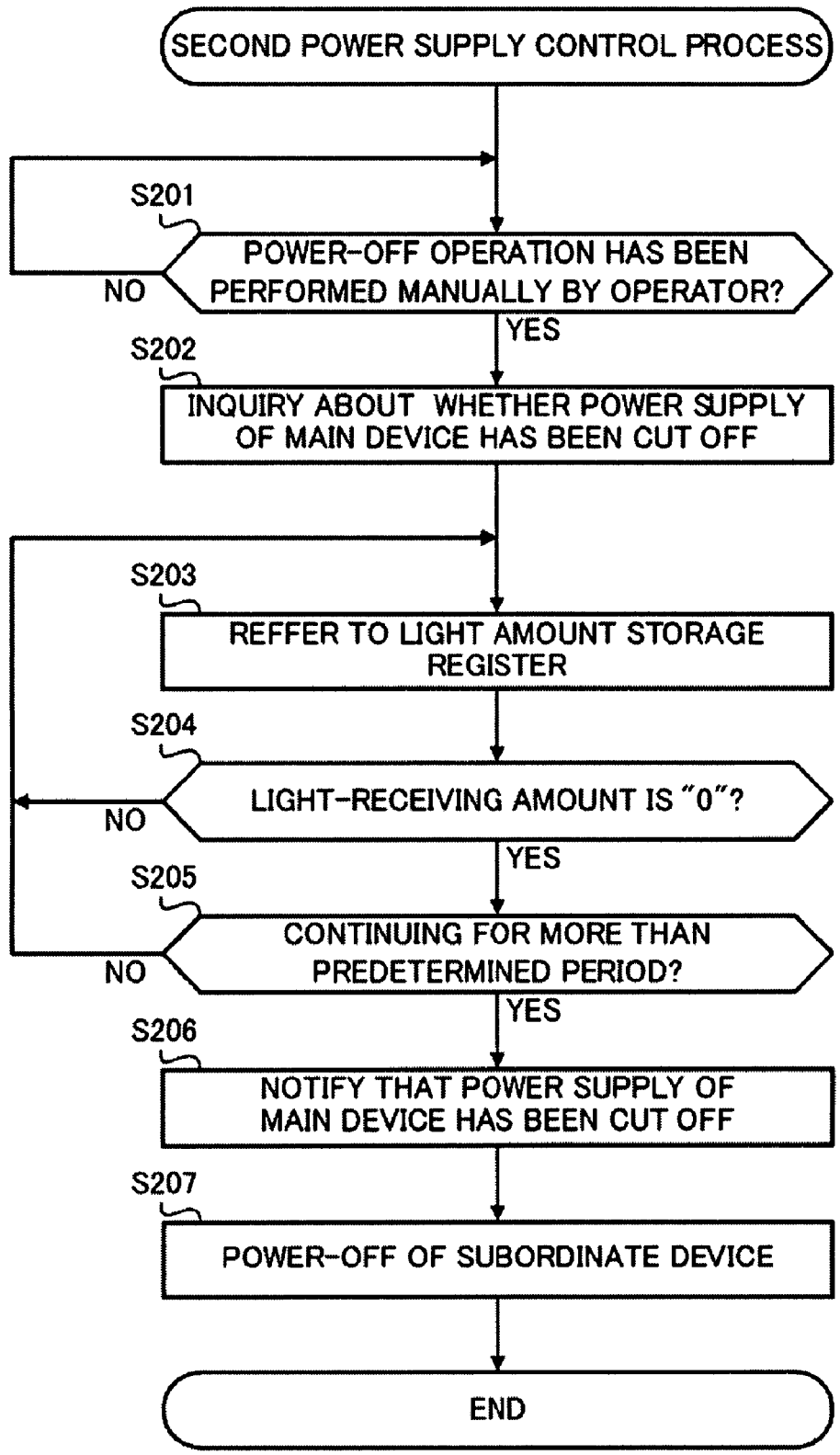
FIG. 6 is a flow chart for explaining a second power supply control process executed by the subordinate device according to the embodiment 2 of the present invention.

A second power supply control process executed by the subordinate device 20 of such a configuration will be described with reference to a flow chart illustrated in FIG. 6. The second power supply control process is started upon start-up of the subordinate device 20.

First, the power supply control part 24 included in the subordinate device 20 determines whether or not the operation for cutting off the power supply of the subordinate device 20 has been manually made by the operator (step S201).

For example, when the operator wants to stop the computer system 1 due to a maintenance work etc., the operator performs the operation for cutting off the power supply of the main device 10 after manually performing the operation for cutting off the power supply by operating the power-source-operation part 26 of the subordinate device 20. The power supply control part 24 determines whether or not such operation of cutting off the power supply of the subordinate device 20 has been manually made by the operator.

When determining that the operation for cutting off the power supply of the subordinate device 20 has not been made manually by the operator (step S201: No), the power supply control part 24 returns a process to the process which determines whether or not the operation for cutting off the power supply of the subordinate device 20 has been made manually by the operator (step S201). Therefore, the power supply control part 24 repeats the process of step S201 until determining that the operation for cutting off the power supply of the subordinate device 20 has been manually made by the operator.

On the other hand, when determining that the operation for cutting off the power supply of the subordinate device 20 has been manually made by the operator (step S201: Yes), the power supply control part 24 inquires of the light reception determination part 23 about whether or not the power supply of the main device 10 has been cut off (step S202).

The light reception determination part 23 determines whether the light-receiving amount is "0" or not with reference to the light amount storage register 221 (step S203) responding to the inquiry from the power supply control part 24 (step S204). In the case that the light-receiving-determination part 23 determines that the light-receiving amount is "0" (step S204: Yes), the light reception determination part 23 determines whether the state is continuing for more than the predetermined period or not (step S205).

When determining that the state in which the light-receiving amount is "0" has continued for more than the predetermined period (step S205: Yes), the light reception determination part 23 judges that the main device 10 connected by means of the optical transmission has entered the state in which the power supply of the main device 10 has been cut off, and notifies the power supply control part 24 that the power supply of the main device 10 has been cut off (step S206).

Then, the power supply control part 24 cuts off the power supply of the subordinate device 20 in response to the notice from the light reception determination part 23 (step S207). Specifically, the power supply control part 24 generates the control signal which performs the power-off operation, and supplies the generated control signal to the power supply device 25. Thereby, since the power supply device 25 starts the operation which cuts off the power supply, the power supply of the subordinate device 20 is cut off. When the power supply control part 24 cuts off the power supply of the subordinate device 20, the second power supply control process will be finished (step S207).

On the other hand, when determining that the light-receiving amount is not "0" (step S204: No), or when determining that the state in which the receiving-light is "0" has not continued for more than the predetermined period (step S205: No), the light reception determination part 23 returns a process to the process which refers to the light amount storage register 221 (step S203). Therefore, in this case, the cutoff of the power supply of the subordinate device 20 mentioned above is not performed immediately.

That is, when the power-off operation of the subordinate device 20 has been manually performed by the operator, and it is determined that that there is no light reception from the main device 10 for the predetermined period, the cutoff of the power supply of the subordinate device 20 is performed.

According to the present embodiment, only when there is an intentional operation of the manual power-off operation, the automatic power supply cutoff based on the presence or absence of the light reception is performed. Therefore, for example, when the power supply of the main device 10 only is desired to be cut off, or when the power supply of the main device 10 has been cut off without the intention, the power supply of the subordinate device 20 is not cut off. Therefore, since the power supply of the subordinate device 20 has not been cut off when the power supply of the main device 10 is restarted, the main device 10 can be restarted in the state in which the power supply of the subordinate device 20 has been turned on in advance.

Since the detection of the light-receiving amount is performed when the manual power-off operation is performed, it is not necessary to always determine the presence or absence of light reception.

As described above, by applying the present invention as the above-mentioned embodiment, the power supply control interlocked between the devices can be realized easily with the simple configuration.

That is, since it can be determined whether the power supply on the side of the main device has been cut off by using the configuration with which the general-purpose optical transmission standard is usually provided, it is not necessary to prepare the special device and interface for the power supply control. Accordingly, the power supply control is realized by a low cost, and an alteration of a system configuration can be easily handled.

The above-mentioned embodiment is an example and an applicable scope of the present invention is not limited thereto. That is, various applications are possible and all embodiments are included in the scope of the present invention.

For example, in each of the above embodiments, although the power supply control in the phase in which the power supply is cut off has been exemplified, the present invention is also applicable to the phase in which the power supply is turned on. In this case, for example, when the manual power supply turning-on operation has been performed on the side of the main device, the presence or absence of the light reception from the subordinate device is determined, and the main device may be controlled so that the power supply turning-on thereof may not be performed unless there is the light reception from the subordinate device. Thereby, the main device can be controlled so that the power supply thereof can not be turned on in the state in which the subordinate device, which must be turned on in advance, is not in the power-on state.

In each of the above embodiments, although Fiber Channel has been exemplified as the standard of the optical transmission system, a standard of the optical transmission system is arbitrary if an on/off status of a device can be determined according to a state of an optical transmission. For example, the present invention may be applicable to the devices connected based on an optical fiber LAN (Local Area Network) standard such as IEEE802.3ah (for example, an iSCSI—compliant disk array device etc.).

Further, in each of the above embodiments, although the disk array device has been exemplified as the subordinate device, a subordinate device to which the present invention can be applied is arbitrary, if the device is such one for which the order of turning on and cutting off the power supply is specified. Similarly, also a main device to which the present invention can be applied is not limited to a host computer, and may be an arbitrary device.

In the above-mentioned embodiment 2, exemplified has been the embodiment in which it is determined whether the power supply of the main device has been cut off when it is determined that there has been the operation by the operator for cutting off the power supply of the subordinate device. However, the order does not matter between the process in which the subordinate device determines whether or not there has been any operation by the operator for cutting off the power supply of the subordinate device, and the process in which the subordinate device determines whether the power supply of the main device has been cut off.

As mentioned above, the light reception determination part 23 and the power supply control part 24 described in each of the above embodiments can be composed of logic circuits such as an LSI and an IC. Accordingly, the subordinate device according to the present invention can be configured by incorporating the logic circuits provided with the function as the light reception determination part 23 and the power supply control part 24 in an existing subordinate device etc. Further, when a prescribed logic circuit is incorporated in the existing subordinate device in advance, and it is possible to alter the function realized by die logic circuit by rewriting a circuit program thereof (for example, when the logic circuit is realized by a FPGA), the subordinate device according to the present invention can be realized by rewriting the circuit program of the logic circuit into the circuit program which performs the same operation as the light reception determination part 23 and the power supply control part 24 described in the above-mentioned embodiments.

In each of the above embodiments, although the computer system which comprises two devices of the main device and the subordinate device has been described as an example, the present invention is also applicable to a computer system comprising three or more devices. For example, a device a power supply of which should be cut off at the very end among the three or more devices is made to be a subordinate device, and all other devices are made to be main devices, and the computer system is configured so that the power supply of the subordinate device may be cut off when there is no light reception from all the main devices.

The process realized by the logic circuit mentioned above, may be realized by a computer provided with a CPU, a RAM, a ROM, or the like. In this case, the subordinate device 20 will have a configuration provided with a computer instead of the logic circuit, and a program for causing this computer to function as the light reception determination part 23 and the power supply control part 24 is stored in the ROM.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

What is claimed is:

1. A computer system including a main device and a subordinate device connected mutually by means of an optical transmission system,
   the main device comprising:
      a main-device-side light reception determination part determining presence or absence of light reception from the subordinate device; and
      a main-device-side power supply control part controlling a power supply operation of the main device at least based on a determination result by the main-device-side light reception determination part,
   the subordinate device comprising:
      a subordinate-device-side light reception determination part determining presence or absence of light reception from the main device; and
      a subordinate-device-side power supply control part controlling a power supply operation of the subordinate device at least based on a determination result by the subordinate-device-side light reception determination part, wherein
   the main-device-side power supply control part turns on a power supply of the main device when a manual power supply turning-on operation has been performed to the main device and the main-device-side light reception determination part determines presence of light reception from the subordinate device, and
   the subordinate-device-side power supply control part cuts off a power supply of the subordinate device when a manual power supply cutting-off operation has been performed to the subordinate device and the subordinate-device-side light reception determination part determines absence of light reception from the main device.

2. The computer system according to claim 1, wherein the subordinate-device-side light reception determination part and the main-device-side light reception determination part determine presence or absence of light reception by detecting a light-receiving amount indicated by a photoelectric converter used in the optical transmission system.

3. A power supply control method that controls a power supply interlock between a main device and a subordinate device connected mutually by means of an optical transmission system, the method comprising:
   a main-device-side light reception determination step of determining, executed by the main device, presence or absence of light reception from the subordinate device;
   a main-device-side power supply control step of controlling, executed by the main device, a power supply operation of the main device at least based on a determination result in the main-device-side light reception determination step;

a subordinate-device-side light reception determination step of determining, executed by the subordinate device, presence or absence of light reception from the main device; and a subordinate-device-side power supply control step of controlling, executed by the subordinate device, a power supply operation of the subordinate device at least based on a determination result in the subordinate-device-side light reception determination step, wherein in the main-device-side power supply control step, a power supply of the main device is turned on when a manual power supply turning-on operation has been performed to the main device and presence of light reception from the subordinate device is determined in the main-device-side light reception determination step, and in the subordinate-device-side power supply control step, a power supply of the subordinate device is cut off when a manual power supply cutting-off operation has been performed to the subordinate device and absence of light reception from the main device is determined in the subordinate-device-side light reception determination step.

4. The power supply control method according to claim 3, wherein in the subordinate-device-side light reception determination step and the main-device-side light reception determination step presence or absence of light reception is determined by detecting a light-receiving amount indicated by a photoelectric converter used in the optical transmission system.

* * * * *